March 24, 1959
D. E. GRISWOLD
2,878,969
BATCH FEED APPARATUS
Filed Dec. 19, 1955
2 Sheets-Sheet 1
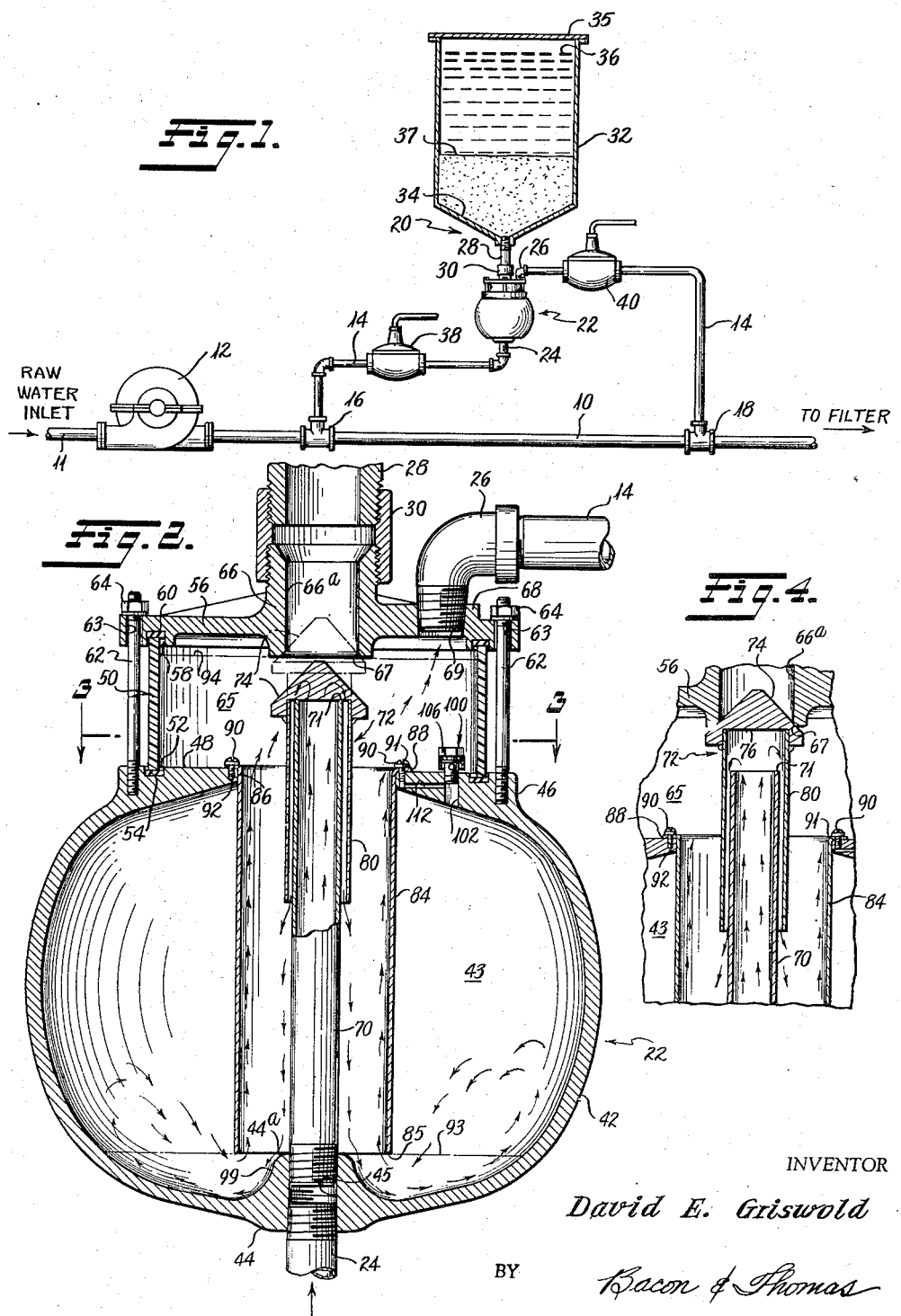
INVENTOR
David E. Griswold
BY Bacon & Thomas
ATTORNEYS March 24, 1959

D. E. GRISWOLD 2,878,969

BATCH FEED APPARATUS

Filed Dec. 19, 1955

INVENTOR
David E. Griswold
BY
Bacon & Thomas
ATTORNEYS

United States Patent Office 2,878,969
Patented Mar. 24, 1959

2,878,969

BATCH FEED APPARATUS

David E. Griswold, Newport Beach, Calif., assignor to Donald G. Griswold, Alhambra, Calif.

Application December 19, 1955, Serial No. 553,821

14 Claims. (Cl. 222—133)

This invention relates to a hydraulically-operable apparatus for feeding particulate solid materials in batch quantities of predetermined volume to a stream of liquid flowing in a pipeline, and more particularly to such a device wherein means are provided for readily varying the volume of such batch quantities.

In my co-pending application, 435,250, filed June 8, 1954, of which this application is a continuation-in-part, I have disclosed a hydraulically-operable batch feeder for supplying a predetermined quantity of material to a flowing liquid stream upon operation of automatic control valves in the liquid system incorporating the batch feeder. This batch feeder comprises a feed chamber having an inlet and outlet for the flow of fluids into which additive materials are to be incorporated, a superimposed tank or container of relatively large dimensions operatively connected to the feed chamber and adapted to hold a replenishing quantity of additive material, and hydraulically operable closure means in the feed chamber responsive to a flow of fluid through the inlet in the feed chamber to close the connecting means between the chamber and replenishing tank, whereby the batch of material in the feed chamber is picked up by the inflowing liquid and is carried out of the chamber with this liquid. All of the material in the feed chamber is thereby incorporated in the flowing liquid stream, and said feed chamber becomes filled with liquid. The closure means automatically reopens when liquid flow through the inlet to the feed chamber is stopped, whereby another batch of additive material may descend by gravity into the feed chamber from the superimposed replenishing tank, thereby displacing the liquid from said chamber and causing it to ascend into the superimposed replenishing tank. The closure means of the feed device is also so designed as to serve as means to insure agitation of the material in the chamber by the inflowing liquid, whereby all of the material is dispersed into the liquid during its passage through the chamber.

The batch feeder described may be incorporated in a valve-controlled bypass line, whereby the manipulation of valves in this line and in the main fluid flow line automatically controls the feeding of a batch of material from the feeder to the main flow line. Thus the feeder is automatically hydraulically-operable by the liquid in the fluid flow line to supply to the liquid system a quantity of additive material equivalent to the volume of the feed chamber. The liquid level in the superimposed container or replenishing tank is automatically maintained by simple replacement of the particulate materials supplied to the feed chamber by an equivalent volume of liquid through the flow line.

The hydraulically-operable batch feeder described may advantageously be incorporated in a filter system wherein measured quantities of filter aid are required for precoating and/or recoating the elements of a filter. The feeder device acts as a bulk feeder for supplying a slurry of the filter aid to the liquid flowing through the filter system. In such a system, the filter elements are normally precoated with filter aid, such as diatomaceous earth, which is built up on the exterior of the filter elements prior to the service run, by passing a slurry of the diatomaceous earth through the filter with a portion of the liquid to be filtered. The diatomaceous earth in suspension in such liquid collects upon the filter elements until a filter coat of substantial thickness is obtained. The quantity of filter aid for such operation may depend upon a number of factors, including the area of the filter surface to be covered, the thickness of the filter coat for the particular operation, and the type of liquid to be filtered. In the feeder device described in my aforementioned co-pending application, the batch quantity of solids fed to the liquid stream upon each activation of the batch feeder, was determined by selection of a feed chamber of predetermined total volume. Thus, feed chambers of different sizes were required to meet the requirements of different filters, different conditions of operation, etc.

An object of the present invention is to provide an improved hydraulically-operated feeder device of the type described, wherein the effective feed capacity of the device may be readily varied to meet the demands of different filters and/or different conditions of operation without change in the size or shape of the feed chamber.

Another object of the invention is to provide a hydraulically-operable feeder device employing a feed chamber of fixed total volume wherein readily interchangeable means are provided for varying the effective feed capacity of such chamber, whereby the feed capacity may be selected in accordance with the requirements of the particular system in which the feeder is incorporated.

Another object of the invention is to provide a hydraulically-operable batch feeder having a feed chamber adapted to receive means for varying the effective feed capacity of the feed chamber and which may be utilized either with or without such means.

Another object of the invention is to provide a hydraulically-operable batch feeder of the type described wherein means for directing fluid flow through the feed chamber and the configuration of the feed chamber co-operate to ensure that all of the additive material in the feed chamber is incorporated in the flowing liquid stream.

A further object of the invention is to provide a hydraulically-operable, adjustable-capacity, bulk-injection feeder for diatomaceous earth filter systems.

A still further object of the invention is to provide an economical means for varying the effective capacity of a feeder chamber adapted to feed particulate solid materials without changing the size or shape of the principal chamber parts.

These and other objects and advantages of the invention will be more readily understood from the ensuing description taken in conjunction with the accompanying drawings, in which:

Fig. 1 is an elevational view, partially in section, of a portion of a fluid flow system incorporating the hydraulically-operable batch feeder of this invention;

Fig. 2 is a vertical, sectional view through the feed chamber of the novel feeder device showing the closure means in a position permitting replenishment of the feed chamber with additive material from the superimposed supply tank, and further showing volume control means in such chamber for limiting the quantity of additive material in the feed chamber to substantially a minimum predetermined volume;

Fig. 4 is a fragmentary, sectional view showing the closure means for the feed chamber in a raised position, whereby liquid flowing into the feed chamber may carry said predetermined quantity of additive material out of said chamber;

Figure 5:
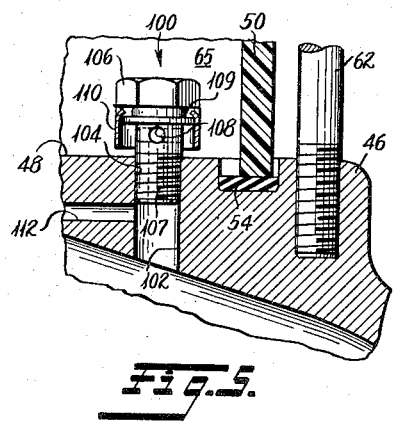
Figure 6:
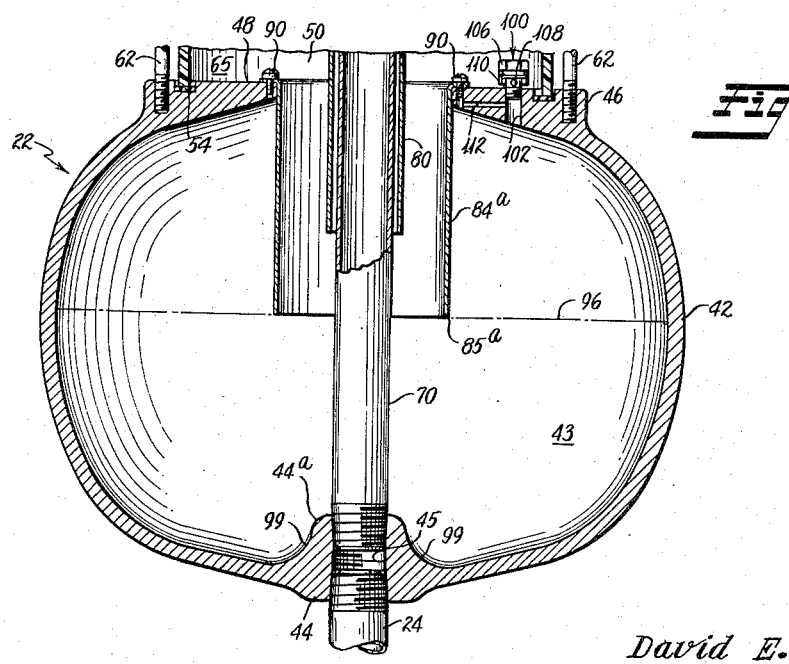

Fig. 5 is an enlarged, fragmentary, sectional view of a portion of the feed chamber showing means for venting the lower section thereof to avoid entrapment of air; and Fig. 6 is a fragmentary, vertical, sectional view of the lower section of the novel feed chamber showing volume-control means for limiting the quantity of additive material in such chamber section to a volume intermediate the minimum and maximum total volume of the feed chamber.

Referring now to the drawings in detail, and particularly to Fig. 1, there is shown a fluid flow line 10 having an inlet 11 and a pump 12 for forcing liquids through a system, which, for example, may comprise a filter system (not shown) as more fully described in my aforementioned co-pending application, S.N. 435,250. In order to supply filter aid, such as diatomaceous earth, for pre-coating or recoating the filter elements during a particular portion of the filter cycle, the supply line 10 is provided with a bypass line 14 connected in the main line 10 by means of T's 16 and 18. The batch feeder of this invention, generally designated as 20, is incorporated in bypass line 14 for feeding a slurry of diatomaceous earth to the liquid stream flowing through such line. The batch feed device 20 comprises a feed chamber, generally designated as 22, having an inlet 24 and an outlet 26 whereby it is connected in the bypass line 14. The feed chamber 22 is further connected by means of conduit 28 and coupling 30 to a superimposed replenishing tank 32. The tank 32 may have a generally conical bottom 34 in order to facilitate the passage of materials by gravity into the communicating conduit 28. The tank 32 is adapted to store a relatively large bulk of diatomaceous earth which is fed as needed to the chamber 22. The tank 32 may be replenished from time to time through any suitable means, it being understood that the top of the tank, while provided with a removable cover 35, is normally open to the atmosphere. As shown in Fig. 1, liquid normally fills the tank 32 to approximately the level shown at 36, and liquid is maintained at approximately this level by automatic operation of the feeder 20 as hereinafter explained. The finely-divided diatomaceous earth, or other solid particulate material, may, during the use of the apparatus, settle in the tank 32 to a level substantially shown at 37.

Hydraulically-operated control valves 38 and 40 are provided in the line 14 on each side of the feed chamber 22 to control the flow of fluid through such feed chamber and thereby control the time period during which additive material from such feed chamber is supplied to the main line 10. The control valves 38 and 40, for example, may be controlled automatically by means of a pilot device which controls the cycle for the entire filter operation. Such an automatic system for controlling the operation of a filter system is described in detail in my aforementioned copending application, S.N. 435,250.

The feed chamber 22, which is shown in detail in Fig. 2, comprises a bulb-like container 42 providing a lower feed chamber section 43. The lower central portion of container 42 has an external boss 44 and an inwardly extending boss 44a through which an axial passageway 45 is provided. Inlet pipe 24, which connects the feed chamber in the bypass line 14, threadedly engages the lower end of passageway 45. The top of the bulb-like container 42 has a raised portion or boss 46, having a flat upper surface 48 upon which is mounted a cylindrical spacer member 50. The spacer member 50 is set in an annular groove 52 in the outer portion of the top surface 48 of the boss 46 and a liquid-tight seal is provided by a gasket 54. A cover member 56 is disposed upon spacer member 50. The bottom of the cover member is provided with an annular groove 58 to receive the upper edge of the spacer member 50, and with a gasket 60 providing a liquid-tight seal. The cover member 56 and spacer member 50 are securely held in assembled relation to the bulb-like member 42 by a plurality of stud bolts 62 upstanding from the boss 46 and extending through aligned openings 63 in the cover member, and by co-operating nuts 64 on the threaded ends of bolts 62. The spacer member 50 may be of transparent material, such as glass or suitable transparent plastic, whereby the inner workings of the feed device may be visually observed. The spacer member 50, cover member 56, and top surface 48 of container 42 form an upper feed chamber section 65.

The cover member 56 is provided with an upstanding boss 66 which is externally threaded, as shown, to receive pipe coupling 30 which establishes communication between the feed chamber 22 and replenishing tank 32 through conduit or pipe nipple 28. Passageway 66a in the boss 66 provides communication between conduit 28 and the upper feed chamber section 65. In axial alignment with boss 66 is a valve seat 67, which extends downwardly into the feed chamber 22. Cover member 56 is also provided with a thickened portion 68, which is bored and threaded, as at 69, to receive outlet elbow 26 for providing communication between the feed chamber 22 and the bypass line 14. Within the feed chamber 22, in axial alignment with the inlet passageway 45 and with the valve seat 67 of the cover member 56, is a standpipe 70 threadedly engaging the passageway 45 at its lower end, and extending upwardly through lower chamber section 43, and terminating at its upper end 71 in the upper chamber section 65. The upper end 71 of the standpipe 70 is provided with a plunger-like valve closure member, generally designated as 72, which is mounted for axial reciprocating motion with respect to the standpipe 70 in such manner that when in its lower position, as shown in Fig. 2, it forms a closure for the open upper end 71 of the standpipe 70, and when in its raised position, as shown in Fig. 4, and in the dot-dash lines of Fig. 2, it forms a closure for passageway 66a in the cover member 56.

The closure member 72 is provided with a conically-shaped top 74 which co-operates with the valve seat 67 when the closure member 72 is in the raised position to thereby act as a valve to prevent filter aid from entering the feed chamber 22 from the replenishing tank 32. The inner bottom face 76 of the closure member 72 provides a flat surface adapted to rest upon the upper edge 71 of the standpipe 70 and thereby act as a check valve when the closure member 72 is in its lower position (Fig. 2) to thereby prevent slurry from entering the standpipe 70 and line 24. The closure member 72 is further provided with a cylindrical skirt 80 concentric with the standpipe 70 and slightly spaced therefrom. Skirt 80 acts to hold the member in substantial alignment with the standpipe 70 and also acts to divert the flow of liquid from the top of the standpipe 70 downwardly as shown by the arrows, whereby the settled solids in the feed chamber section 43 are agitated and picked up by the flowing liquid and removed from this chamber section and from upper chamber section 65 by flow through the outlet elbow 26.

It will be seen that the volume of particulate solids that may be entrained in the liquid flowing through the feed chamber 22, when this chamber is connected in the flow line 14 by operation of the control valves 38 and 40, is dependent upon the effective chamber volume into which such particulate solids may settle. An important feature of this invention is the provision of means whereby the total effective volume of such chamber may be readily altered in predetermined manner. This is accomplished by the simple insertion of a calibrated volume-control means in the feed chamber. The volume-control means comprises a volume-control tube, such as tube 84, which is adapted to be placed in the lower chamber section 43 in co-axial relationship with the standpipe 70. The top portion of the bulb-like container 42 is provided with a relatively large central opening 86 through which the tube 84 may be inserted, so that its lower end extends downwardly into the lower chamber section 43, and is spaced from the bottom of the chamber section at a distance determined by the calibrated length of the tube 84. The top of the tube 84 is provided with a flange 88, which rests upon the top surface 48 of the boss 46, and is secured to boss 46 by a plurality of screws 90, which extend through openings 91 in flange 88 into registering threaded openings 92 in boss 46.

According to the invention, the feed device 22 is furnished with a single volume-control tube 84 or a set of volume-control tubes of different lengths is provided, depending upon service requirements. Each tube of such set is calibrated to permit a predetermined total effective volume of solids to settle by gravity in the feed chamber 22. One such additional volume-control tube is that shown in Fig. 6 and designated by reference numeral 84a.

It has been found that the volume or portion of the lower chamber section 43 to which the solids will settle from the replenishing tank 32, when closure member 72 is in the downward position and quiescent conditions obtain in the feed device, is established by the position of the lower edge of the volume-control tube in the chamber 43, it being understood that the solids will fill the upper chamber section 65, tube 84 and a part of chamber 43. Thus, as may be observed from Fig. 2, the level to which the solids settle is determined by lower edge 85 of tube 84. This level is indicated by the line 93 representing the approximate interface between the settled solids phase and liquid in the chamber 43. It will be seen that the total effective volume of the lower chamber section 43, and therefore also of chamber 22, with respect to settled solids, when utilizing a tube 84 of the length shown in Fig. 2, is relatively small since most of the chamber 43 is filled with liquid only.

In Fig. 6, there is shown a lower chamber section 43 wherein the volume-control tube 84 has been replaced with the shorter tube 84a, selected so that it is of a calibrated length extending downwardly approximately midway between the bottom and top portions of chamber 43. Here again, the solids from the replenishing tank 32 will settle under relatively quiescent conditions when the closure member 72 is in the downward position, to a level determined by the bottom edge 85a of the tube 84a. The level of the settled solids in the lower chamber section 43 is represented by the line 96 showing the approximate interface between solid and liquid phases. With the tube 84a, about one-half of the total volume of lower chamber section 43 is filled with settled solids and the other half with liquid only. Thus, it will be seen that the total effective capacity of the feed device will vary from a maximum—when no tube is employed, to a minimum when a volume-control tube is employed which is of sufficient length to place the bottom edge substantially flush with the bottom of the lower chamber section. For example, in a device having a lower chamber section 43 of a height of approximately 10″ and an opening 86 of approximately 4″ accommodating a volume-control tube of 4″ external diameter, it has been found that when utilizing diatomaceous earth as the material to be fed, the feed chamber 22 without a volume-control tube has a total effective capacity of 16 pounds, which represents the maximum quantity of material that can be fed per batch. By using volume-control tubes of calibrated length varying between 9.88″ and .859″ in length, the effective capacity of the feed device can be varied between about three pounds and about fifteen pounds. It will be understood that all quantities are given with respect to the entire feed chamber 22, which includes both the lower chamber section 43 and upper chamber section 65. The volume of the latter chamber is constant, the settled solids in each instance rising to a level approximately that shown by the line 94, Fig. 2, determined by the bottom of valve seat 67.

The following table is illustrative of the length of tube to be used in a device of the size indicated for supplying amounts of diatomaceous earth of from three to fifteen pounds:

| Pounds Diatomaceous Earth | Tube Length (Inches) | Pounds Diatomaceous Earth | Tube Length (Inches) |
|---|---|---|---|
| 3.00 | 9.88 | 10.00 | 4.145 |
| 4.00 | 8.750 | 11.00 | 3.589 |
| 5.00 | 8.047 | 12.00 | 2.984 |
| 6.00 | 7.375 | 13.00 | 2.359 |
| 7.00 | 6.813 | 14.00 | 1.672 |
| 8.00 | 5.257 | 15.00 | .859 |
| 9.00 | 4.701 | 16.00 | no tube necessary. |

It will be understood, of course, that the lengths of a set of volume-control tubes may be determined by calibration for different materials to be fed by the feeder device, the exact quantity of material dispensed with a particular tube being dependent upon the specific gravity and settling characteristics of the material used. Alternatively, the same set of volume-control tubes may be used with different materials, the set of tubes being recalibrated for each different material.

Figure 3:
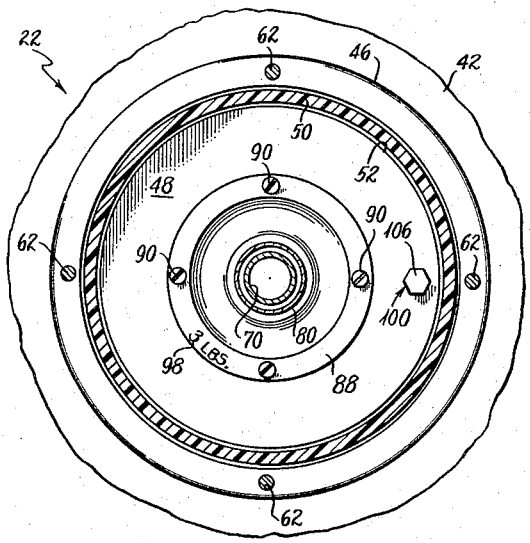
Fig. 3 is a cross-sectional view taken on the line 3—3 of Fig. 2.

For convenience, the quantity of a material, such as diatomaceous earth, which will be dispensed by the feeder with a particular volume-control tube may be stamped on the flange 88 of such tube, as shown at 98 in Fig. 3.

In order to replace one volume-control tube with another of different length, for example, to replace tube 84 with tube 84a so that a greater volume of solids may be dispensed per batch, it is merely necessary to unscrew nuts 64 from the bolts 62, remove cover member 56, remove screws 90, withdraw tube 84, insert the tube 84a, and replace the screws 90, cover member 56 and nuts 64. It will be seen that replacing the control tube is at least as simple as replacing the entire feed chamber and is much more economical.

In order to prevent entrapment of air in the lower chamber section 43 when the volume-control tube is employed, the top portion of this chamber is provided with a vent assembly generally designated as 100. This vent assembly 100, as is more clearly shown in Fig. 5, comprises a bolt 106 which is mounted in a passageway 102 in the boss 46, which is threaded at 104. The bolt 106 has an axial passageway 107 and radial openings 108 which establish communication between passage 102 and the upper chamber section 65 of the feed device, in the manner shown. The bolt 106 has a groove 109 in which the upper end of a skirt 110 is crimped and extends to a point below the level of vent openings 108, but terminates at a point spaced from the top surface 48 of the boss 46. Passageway 102 is provided with a lateral extension 112, which communicates with substantially the topmost portion of the lower chamber section 43. Therefore, any air trapped in the lower chamber section 43 may pass through the lateral extension 112 up through the passageway 107 and openings 108 in the bolt 106 downwardly under the skirt 110 and into the upper chamber 65 and then out of the elbow 26 into the line 14. The skirt 110 prevents clogging of the vent openings 108, since the settled solids in the upper chamber 65 will not settle above the lower edge of the skirt and therefore will not pass into the vent openings.

In the operation of the system, assuming that the valves 38 and 40 are closed and that tank 32 has been filled with liquid and filter aid, the flow conditions in the feeder are relatively quiescent, and the closure member 72 will be held in the downward position, as shown in Fig. 2, by the force of gravity. Solids will settle from the replenishing tank 32 downward through conduit 28 into the feed chamber 22 seeking, for example, level 93, when a tube 84 of substantially maximum length is employed, whereupon a predetermined volume of settled solids, depending upon the particular tube length, is contained in the feeder. Thus, for example, may be sufficient to provide a quantity of diatomaceous earth of three pounds when the tube length is 9.88 inches. Upon opening of valves 38 and 40 on demand by the filter system for a batch of diatomaceous earth, the liquid flows up through inlet conduit 24 and standpipe 70, raises the closure member 72 so that the conically-shaped top portion 74 seats upon valve member 67. Liquid thereupon flows downwardly between the skirt 80 of the closure member 72 and standpipe 70, swirls upward around the inner curved walls of lower chamber section 43, and finally passes up the inside of the volume-control tube 84 into upper chamber section 65, and out through elbow 26. The general direction of such flow is indicated by the arrows in Fig. 2, it being understood that such flow is only during the period in which closure member 72 is raised to the position shown in dot-dash lines in Fig. 2, or in full lines in Fig. 4.

The settled solids in lower chamber section 43, volume-control tube 84, and upper chamber section 65 are picked up by the flowing stream and carried into the line 14 for entry into main line 10. The rounded configuration of the walls of lower chamber section 43 in cooperation with the outwardly curved portion 99 of the boss 44a, upon which liquid flowing between skirt 80 and standpipe 70 impinges, facilitates the swirling of the liquid in chamber section 43 and the effective removal of all settled solids from the chamber. This holds true whether or not a volume-control tube is employed, since there are no stagnant areas in which solids may tend to accumulate.

After removal of the batch of solids from feeder 22, valves 38 and 40 are closed, quiescent conditions in the feeder 22 again obtain, the valve closure member 72 retracts downwardly by force of gravity, closing off the top of standpipe 70 and permitting solids to again settle by gravity to the predetermined level in the feed chamber. It will thus be seen that a completely automatic and hydraulically-operated feeder has been devised for supplying any preselected volume of solids to a flowing fluid.

An important feature of this type of feeder is the fact that once the feeder and replenishing tank have been filled to the desired level, as, for example, to the level shown at 36 in Fig. 1, this level is automatically maintained substantially constant during all subsequent operations without requiring complex liquid-level control apparatus. This is made possible by reason of the fact that any additive material descending into the feed chamber 22, when the closure member 72 is in the downward position, simply displaces an equal volume of liquid from the feed chamber 22, which liquid rises into tank 32 to maintain the liquid level therein substantially constant. In other words, there is simply a transfer of added material in tank 32 for liquid in the chamber 22. During operation of the feeder to supply material to the fluid flow line, the additive material in chamber 22 is replaced with another volume of liquid from the flow line. While the solids in tank 32 obviously must be replaced from time to time, no replacement of liquid is necessary, once the operation is started. Should any clogging of the system occur, or should the system for any other reason fail to operate, the operator may quickly determine by visual observation through the transparent side walls of spacer 50 whether the valve closure member 72 is working properly. However, since this closure member is the only moving part of the feed device, mechanical failure is a rare occurrence.

While the invention has been described in terms of specific apparatus and systems, it is understood that this is by way of illustration only, and is not to be deemed limiting in any sense, the invention being limited solely by the scope of the appended claims.

I claim:

1. A batch feeder for feeding particulate solids to a liquid stream, comprising: a feed chamber having an inlet and outlet for the flow of liquid, a superimposed replenishing container for said particulate solids, connecting means establishing communication between said chamber and container whereby the particulate solids in said container may settle by gravity into said chamber, closure means for said connecting means, and volume-control means in said chamber for limiting the volume to which said particulate solids may settle to a predetermined quantity less than the total volume of said chamber.

2. The combination of claim 1, wherein said volume-control means is replaceable with volume-control means adapted to limit the volume to which said particulate solids may settle in said chamber to a different predetermined quantity.

3. The combination of claim 1, wherein said volume-control means comprises a replaceable tube in substantial alignment with said connecting means whereby said particulate solids are adapted to settle into the upper end of said tube, and wherein the bottom of said tube is spaced from the bottom of said feed chamber and determines the height to which said particulate solids may settle in said chamber.

4. A batch feeder for feeding particulate solids to a flowing liquid stream, comprising the combination of: a feed chamber having an inlet and an outlet for the flow of liquids; a container for said particulate solids; connecting means affording communication between said chamber and container, said container being positioned for gravity flow of said particulate solids into said feed chamber through said connecting means; means for opening and closing said connecting means whereby said connecting means may be opened during periods when liquid flow through said chamber ceases thereby permitting settling of said particulate solids from said container into said chamber and said connecting means may be closed during periods of liquid flow through said chamber; and volume control means in said feed chamber for limiting the volume to which said particulate solids may settle to a predetermined quantity less than the total volume of said container.

5. A batch feeder for feeding particulate solids to a flowing liquid stream, comprising the combination of: a feed chamber having an inlet and an outlet for the flow of liquid; a superimposed container for said particulate solids; connecting means affording communication between said chamber and container; means movable by force of liquid flowing through said chamber to a position to obstruct flow through said connecting means, and movable by force of gravity to a non-obstructing position relative to said connecting means when liquid ceases to flow through said chamber, whereby said particulate solids are adapted to settle by gravity from said superimposed container into said feed chamber, when said connecting means are not obstructed, to thereby replenish said feed chamber; and volume-control means in said feed chamber for limiting the volume to which said particulate solids may settle to a predetermined quantity less than the total volume of said feed chamber.

6. Batch feeding apparatus for feeding particulate solids in predetermined quantities to a liquid stream, comprising: a feed chamber; means dividing said feed chamber into an upper chamber section and a lower chamber section, said means including an opening communicating between said upper and lower chamber sections; a cover for said upper chamber section; liquid inlet means in said lower chamber section; liquid outlet means in said upper chamber section, inlet means in said upper chamber section for the introduction of said particulate solids; and volume-control means in said feed chamber comprising a tube of predetermined length secured within said opening communicating between said chamber sections and extending downwardly toward the bottom of said lower chamber section, whereby the level to which particulate solids may rise in said lower chamber section is determined by the position of the bottom of said tube.

7. The batch feeding apparatus of claim 6 wherein said liquid inlet means includes a standpipe extending upwardly through said opening between said chamber sections and terminating in said upper chamber section; and wherein means are included for diverting liquid from the top of said standpipe downwardly around the outside of said standpipe and into said lower chamber section; and wherein said volume control tube is disposed in spaced concentric relation to said standpipe.

8. The batch feeding apparatus as defined in claim 7, wherein the walls of said lower chamber section are of rounded configuration whereby liquid diverted downwardly into said chamber section is caused to swirl through said chamber section, pick up solids therein, and carry them upwardly through said volume-control tube.

9. The batch feeding apparatus as defined in claim 6, wherein vent means are provided between said upper and lower chamber sections to prevent entrapment of air in said lower chamber section.

10. Batch feeding apparatus for feeding particulate solids in predetermined quantities to a liquid stream, comprising: a feed chamber; means dividing said feed chamber into an upper section and a lower section, said means having an opening between said upper and lower sections; a cover for said upper chamber section; liquid inlet means in said lower chamber section including a standpipe extending upwardly through said opening and terminating in said upper chamber section; means for diverting liquid from the top of said standpipe downwardly around the outside of said standpipe and into said lower chamber section; liquid outlet means in said upper chamber section; inlet means in said upper chamber section for the introduction of particulate solids, said solids being adapted to settle through said opening into said lower chamber section; said lower chamber section being of relatively large volume and having rounded interior walls preventing lodgement of said particulate solids during liquid flow through said apparatus, said means dividing said feed chamber into upper and lower sections also being adapted to receive a volume control tube for determining the effective volume of settled solids in said lower chamber section.

11. Batch feeding apparatus for feeding particulate solids in predetermined quantities to a liquid stream, comprising: a feed chamber; a cover for said feed chamber; liquid inlet means in said feed chamber; liquid outlet means in said feed chamber; inlet means for introducing particulate solids into the top of said feed chamber; and volume-control means disposed in said feed chamber comprising an open-end hollow member secured in said feed chamber with its upper end disposed to receive particulate solids from said inlet means for particulate solids and with its lower end spaced a predetermined distance from the bottom of said feed chamber for determining the height to which said particulate solids may rise in said feed chamber.

12. A batch feeder for a filter system, comprising the combination of: a feed chamber having an inlet and an outlet adapted to be connected with said filter system and to receive an intermittent flow of liquid therefrom; a tank adapted to contain a slurry of filter aid; connecting means affording communication between said chamber and tank; means for opening and closing said connecting means so that said connecting means may be opened during periods when there is no liquid flow through said chamber to permit filter aid to settle from said container into said chamber, and said connecting means may be closed during periods of liquid flow through said chamber; a cover for said feed chamber; and volume-control means in said feed chamber comprising a calibrated tube for determining the volume to which said filter aid may settle in said feed chamber.

13. A feed chamber for batch-feeding apparatus adapted to feed predetermined quantities of particulate materials to a liquid stream, comprising: a bulb-shaped container defining a lower feed chamber section, said container having a relatively flat top surface; a cylindrical spacer member mounted upon the top surface of said container; a cover member mounted on said cylindrical spacer member; means removably securing said spacer member and said cover member to said container, said cover member, spacer member and the top of said container defining an upper feed chamber, said bulb-shaped container having an inlet opening in the bottom thereof for the flow of liquid, and having a relatively larger opening in the top thereof establishing communication between said upper and lower feed chamber sections, said cover member having an inlet opening for particulate solids, said openings in said container and cover member being in vertical axial alignment; a standpipe vertically disposed in said feed chamber with the bottom end thereof in communication with the inlet opening in the bottom of said lower chamber section and the top end thereof terminating in said upper chamber section; a reciprocating valve member mounted on said standpipe, said valve member having a cylindrical skirt concentric with said standpipe and spaced outwardly therefrom to divert the flow of liquid entering the chamber through said standpipe downwardly along the outside of said standpipe toward the bottom of said lower feed chamber section, said valve member being movable by force of liquid flowing through said standpipe to close the vertically aligned particulate solids inlet in said cover member and to descend by force of gravity to close said standpipe when flow through said standpipe ceases, said cover member having a second opening providing an outlet from said feed chamber; and a volume-control tube in the top opening of said bulb-shaped container concentric with said standpipe and spaced outwardly therefrom, said volume-control tube extending downwardly into said lower chamber section for a predetermined length to thereby control the height to which particulate solids may settle in said chamber section.

14. The feed chamber of claim 13, wherein said cylindrical spacer member is of transparent material whereby the operation of said valve member may be visually inspected.

References Cited in the file of this patent

UNITED STATES PATENTS

| | | |
|---|---|---|
| 412,910 | Blessing | Oct. 15, 1889 |
| 1,846,419 | Harwood et al. | Feb. 23, 1932 |
| 2,097,813 | Gollings | Nov. 2, 1937 |
| 2,603,397 | Olson | July 15, 1952 |
| 2,733,814 | Booth | Feb. 7, 1956 |